United States Patent

[11] 3,589,753

| [72] | Inventor | Michel Joseph Julien Pequignot<br>Paris, France |
|---|---|---|
| [21] | Appl. No. | 845,357 |
| [22] | Filed | July 28, 1969 |
| [45] | Patented | June 29, 1971 |
| [73] | Assignee | Quartz and Silice<br>Paris, France |
| [32] | Priority | Aug. 5, 1968 |
| [33] | | France |
| [31] | | 161864 |

[54] COUPLING APPARATUS
8 Claims, 3 Drawing Figs.

[52] U.S. Cl. .................................................. 285/408,
285/423
[51] Int. Cl. ........................................................ F16l 23/00
[50] Field of Search ............................................. 285/364,
365, 366, 367, 97, 96, 106, 406, 407, 408, 409;
277/34.3

[56] References Cited
UNITED STATES PATENTS

| 922,075 | 5/1909 | Bates............................ | 285/97 |
| 1,854,855 | 4/1932 | Nakashima.................... | 285/367 X |
| 3,236,544 | 2/1966 | Brown.......................... | 285/97 |
| 3,398,978 | 8/1968 | Gasche......................... | 285/367 X |

FOREIGN PATENTS

| 301,066 | 10/1929 | Great Britain................ | 285/97 |
| 912,645 | 5/1954 | Germany...................... | 285/106 |

Primary Examiner—Thomas F. Callaghan
Attorney—Kenway, Jenney & Hildreth

ABSTRACT: Apparatus is provided for coupling a pair of flanged tubes in clamped relation. Embracing the juxtaposed flanges is a collar containing channels so arranged that a flexible hose housed in the channels may be pressurized to expand radially and press the flanges together. When the pressure is relieved, the collar may be quickly slipped off the flanges to permit uncoupling of the tubes.

INVENTOR
MICHEL J.J. PEQUIGNOT

PATENTED JUN 29 1971 3,589,753
SHEET 2 OF 2
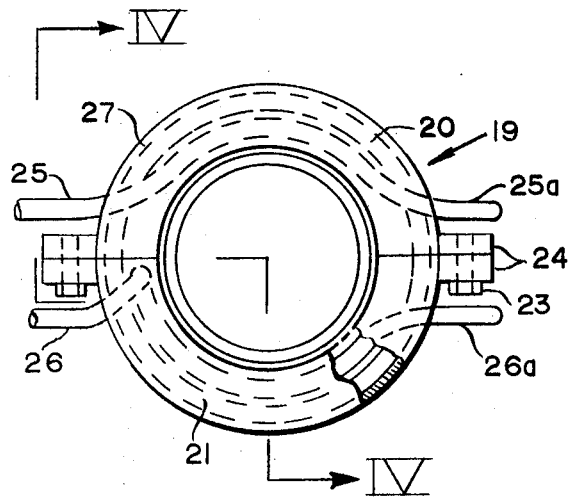
FIG. 3
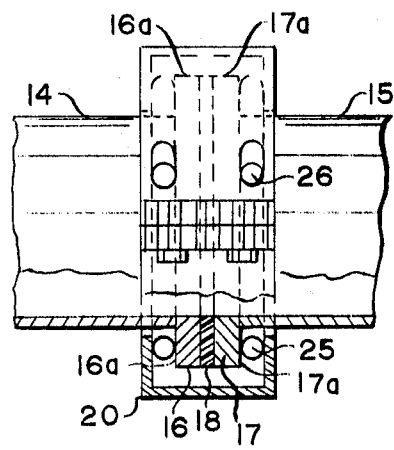
FIG. 4
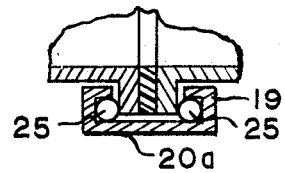
FIG. 4a
FIG. 5
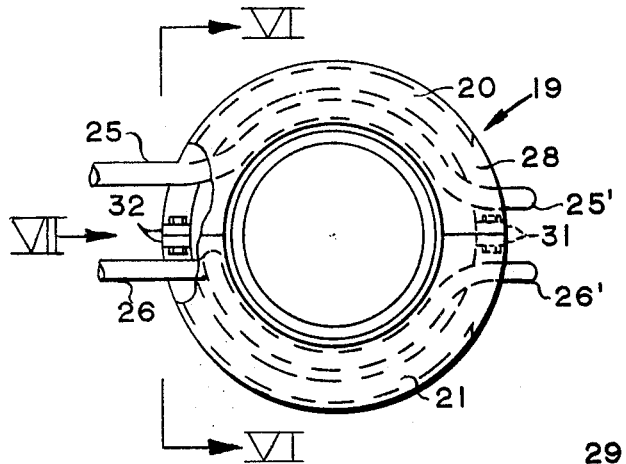
FIG. 7
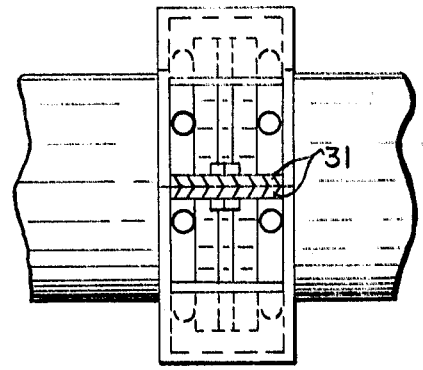
FIG. 6
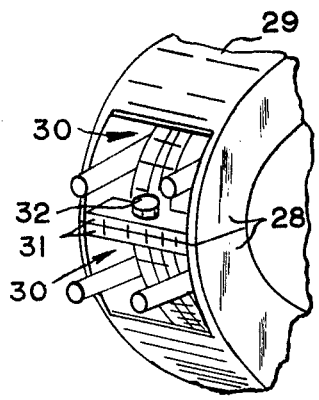
INVENTOR
MICHEL J. J. PEQUIGNOT
BY Jenney, Jenney & Aldrich
ATTORNEYS

COUPLING APPARATUS

APPARATUS FOR COUPLING TUBES

This invention relates to a coupling apparatus and more particularly to a coupling apparatus which employs fluid pressure to clamp together a pair of flanged tubes.

At the present time, refractory tubes, such as those made from borosilicate or quartz glass, are employed in industries wherein products of high purity are treated, such as in the electronic or atomic fields, These tubes are provided with inlet means for introducing a treating fluid and are usually made of two separate mating components which can be separated for introduction of a solid material to be treated and subsequently joined to afford treatment of the solid material with the fluid. It is essential during treatment that the tube components be tightly held together to prevent the introduction of contaminating foreign matter into the tubes. For example, in the production of microcircuits such as those made from silica wafers doped by the diffusion of the treating material into the monocrystals or treated to cause epitaxial crystal growth it is necessary frequently to assemble and disassemble the tubes, especially when the microcircuits comprise multiple layers. Consequently, it is desirable to have a tube-coupling system capable of relatively rapid manipulation. Brute force clamps cannot be used because the tubes are usually fragile refractory material. In current practice, refractory tubes are coupled by bolts distributed about the periphery and extending through flanges on the tubes and through a gasket therebetween made from rubber, silicone, plastic material or the like. The flanges, also made from refractory material are subjected to local pressures which increase the risk of rupture, a risk aggravated by common defects in the molding or fabrication of the tubes.

The apparatus of the present invention comprised a collar embracing all or substantially all of the periphery of the flanges and has internal channels housing flexible hoses engaging the outer surfaces of the flanges. When a fluid is introduced under pressure into the hoses they expand to exert clamping pressure on the flanges of the tubes. A gasket or other flexible sealing means is placed between the inner surfaces of the flanges.

The present invention provides a substantial advantage over presently available apparatus for joining tubular apparatus. Since the pressure through the fluid-carrying hose is applied evenly over the flange surface in contact therewith, the danger of rupturing the fragile tubes due to excessive localized pressure is substantially reduced. Furthermore, the coupling apparatus of this invention is readily adaptable for quickly and conveniently applying and releasing pressure on the tubes so that they can be easily joined and separated. Thus the use of the apparatus of this invention provides for a substantial reduction in process downtime for processes being conducted in the tubes.

The objects, features and advantages of the invention will moreover be evident from the following description of several embodiments chosen by way of example and shown in the accompanying drawings:

FIG. 3 shows another embodiment of the coupling apparatus used to join circular tubes.

FIG. 4 is a cross-sectional view along the line IV–IV of FIG. 3.

FIG. 4a shows a variation of the coupling device shown in FIG. 4.

FIG. 5 shows another embodiment of the coupling device used for circular flanges.

FIG. 6 is a cross-sectional view along the line VI–VI of FIG. 5.

FIG. 7 is a partial perspective view following the arrow VII in FIG. 5.

Figure 1:
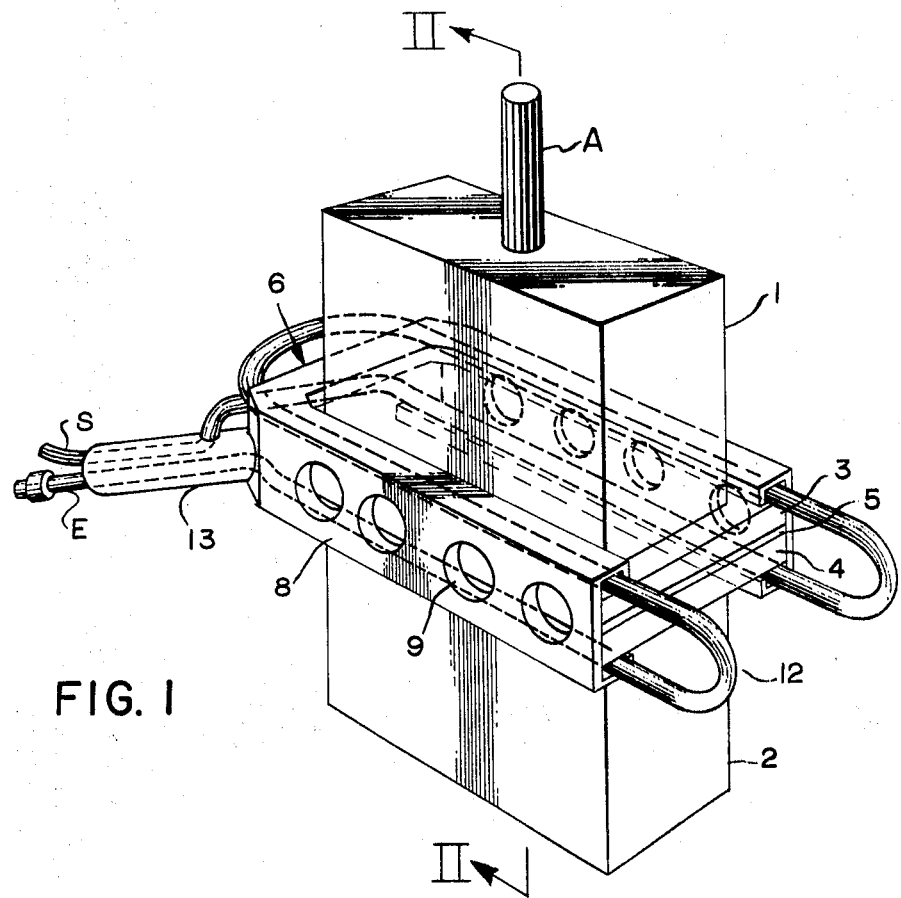
FIG. 1 is a perspective view of the coupling apparatus used to join tubes of rectangular cross section.
Figure 2:
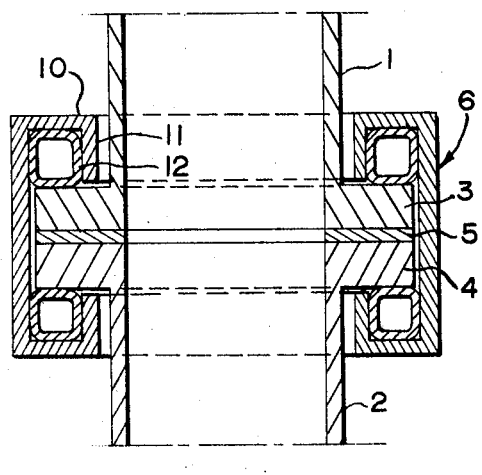
FIG. 2 is a cross-sectional view along the line II–II of FIG. 1, when there is fluid under pressure in the conduits.
Figure 2A:
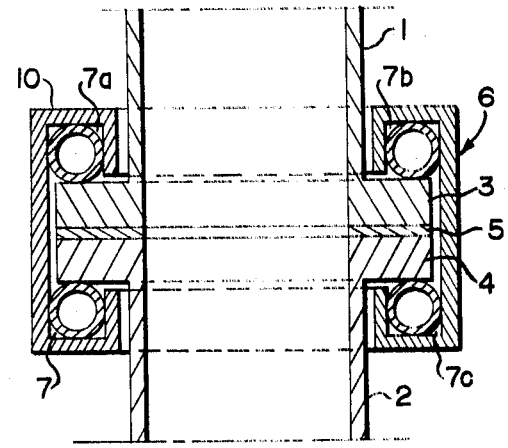
FIG. 2a is also a cross-sectional view along the line II–II of FIG. 1 when there is no fluid under pressure in the conduits.

As shown in FIGS. 1 and 2, a pair of tubes 1 and 2 provided with a feed inlet A are coupled by the clamping of their rectangular flanges 3 and 4, between which a gasket 5 is interposed. The flanges 3 and 4 are confined on three sides by a collar 6 in the form of a U-shaped piece also having a U-shaped cross section as shown in FIGS. 2 and 2a, the web 8, of which is lightened by perforations 9. The wings 10, and walls 11 of collar 6, form grooves or channels for receiving a radially flexible hose 12, to follow the course described by the hose from its end E, as shown in FIG. 1. The hose 12 enters into the lower channel 7, at the left side through a tubular member 13 joined to the collar 6; then it runs successively through that channel 7, the high channel 7a on the left side, the high channel 7b on the right side, the low channel 7c on the right side, and back through the tubular member 13 from which it exits at the end S. The assembly of the two flanges 3 and 4 is provided by fluid being introduced into the tube 12 to cause it to expand radially to conform to the cross section of the channels 7, 7a, 7b, and 7c as shown in FIG. 2, and to exert pressure on the flanges 3 and 4 along the length of two parallel sides, preferably the longer sides.

The flexible tube 12 is adapted to expand radially and can be a thin rubber tube inserted in a woven casing or other suitable flexible material. The rubber can be natural rubber or if it is exposed to elevated temperatures, synthetic rubber, or it can be replaced by any suitable plastic material. The collar 6 can be made of nylon when employed at ordinary temperatures or glass filaments or asbestos when employed at elevated temperatures. The collar 6 renders the hose practically inextensible lengthwise, while permitting it to expand radially.

It is readily apparent from the drawings, specifically FIG. 2 that by connecting the hose 12 to any conventional means (not shown) for introducing a fluid under pressure, through one of its ends E, or S, its transverse expansion has the effect of pressing the flanges 3 and 4 together. The clamping force is extended throughout the length of the longer sides of the flanges, and the reactions to the clamping forces are in equilibrium.

In one embodiment of this invention, the connection of the two extremities E and S of tube 12 to the source of fluid makes it possible to circulate this fluid in an open circuit and to cool it in order to refrigerate the flanges at the joint.

The channels are of a size to facilitate retention of the empty hose 12 when the fluid pressure therein is relieved. When the pressure in hose 12 is relieved, the clamp 6 can be slidably removed from contact with the flange 3 and 4.

The use of tubular member 13 to house the two ends, E and S of the flexible hose 12 facilitates connecting the hose 12 to the source of fluid.

As shown in FIGS. 3 and 4, tubes 14 and 15 are coupled by the clamping of circular flanges 16 and 17 between which is interposed gasket 18. The collar 19 consists of two semicircular collars 20 and 21 each having a U-shaped cross section as shown in FIG. 4 and are joined by bolts 23 extending through lugs 24 which are an integral part of collar 19. The semicircular collar 20 contains a flexible hose 25 which extends along the outer surface 16a of the flange 16, then returns at 25a along the outer surface 17a of flange 17. The semicircular collar 21 contains a flexible hose 26 extending along the outer surface 16a of flange 16 and then returns at turn 26a along the outer surface 17a of flange 17. A housing can be joined to the opening 27 to house tubes 25 and 26 in a manner analogous to the housing 13 of FIG. 1.

In the variation shown in FIG. 4a, the cross section of the collar 19 can be varied to more fully surround and retain the empty flexible hose 25 as is shown in FIGS. 1 and 2.

The embodiment shown in FIGS. 5, 6 and 7 includes analogous elements designated by the same reference characters. However, in this case the joining means 31 and 32 are in fact metallic plates welded to wings 28 of the collar 20 and adapted to be joined by bolts. The openings 30 in web 29 permit access to the bolts 32 as well as entrance and egress for the flexible hoses 25 and 26.

The coupling apparatus of this invention can be easily adapted to conform to tubes having a periphery of any shape. The collar should be of a shape and size so that it can be easily removed from the outer portion of the tube. Thus, the collar can be adapted so as to be slidably removed from the flanges, as for example as shown by the assembly of FIG. 1. On the other hand, the collar can be formed from a plurality of sections fastened end to end as for example as shown by the assembly of FIGS. 3 and 5. The means for joining the collar sections end to end or the number of collar sections employed is not critical. All that is necessary is that the collar forms a channel of a size to accommodate a flexible hose and permits expansion of the hose to exert pressure on the flanges to provide a tight connection of the tubes. Any conventional means for joining collar sections can be employed such as with clips, brackets, clamps, straps, tabs, hooks, bolts or the like. In addition, the expandable hose contacts a sufficient portion of the flange to exert sufficient pressure and provide an airtight seal between the tubes. This depends upon the forces to which the tubes are normally subjected and the shape of the tube periphery. It is preferred that the flexible hose engage most of the outer surfaces at the flanges to insure complete sealing. It is also preferred to employ a seal between the juxtaposed surfaces of the flanges so as to provide a tight seal therebetween and to reduce the probability of rupturing the tubes.

I claim:

1. An apparatus for coupling tubes each having a flange on the outer periphery at the end to be coupled which comprises a collar having a base and wings extending from said base in the same direction, hollow channels each defined by said base, one of said wings and one of said flanges wherein said wings and said flanges comprise opposing sides of each channel, a flexible hose adapted to expand radially under pressure extending within each channel, said collar having openings in the base thereof for ingress and egress of said flexible hose in each channel, each hose engaging the outer radial surface of the flange and the inner radial surface of the wing, and means for introducing a fluid under pressure into each hose, said hoses, when expended, forcing the flanges together in sealing relationship.

2. The apparatus of claim 1 wherein said flexible hose comprises a single continuous hose.

3. The apparatus of claim 1 wherein said collar extends around the entire periphery of said tube.

4. The apparatus of claim 1 wherein said collar is formed of two joined mating sections.

5. An apparatus for coupling tubes each having a flange on the outer periphery at the end to be coupled which comprises a collar having a base, wings extending from said base in the same direction and a wall extending from each wing, hollow channels each defined by said base, one of said wings, one of said walls and one of said flanges wherein said wings and said flanges comprise opposing sides of each channel, said collar having openings in the base thereof for ingress and egress of said flexible hose in each channel, each hose engaging the outer radial surface of the flange and the inner radial surfaces of the wing and the wall, and means for introducing a fluid under pressure into each hose, said hoses, when expanded, forcing the flanges together in sealing relationship.

6. The apparatus of claim 5 wherein said flexible hose comprises a single continuous hose.

7. The apparatus of claim 5 wherein said collar extends around the entire periphery of said tubes.

8. The apparatus of claim 5 wherein said collar is formed of two joined mating sections.